Aug. 21, 1956 R. O. HELGEBY 2,759,447
DISC TYPE INDICATING INSTRUMENT
Filed March 12, 1953
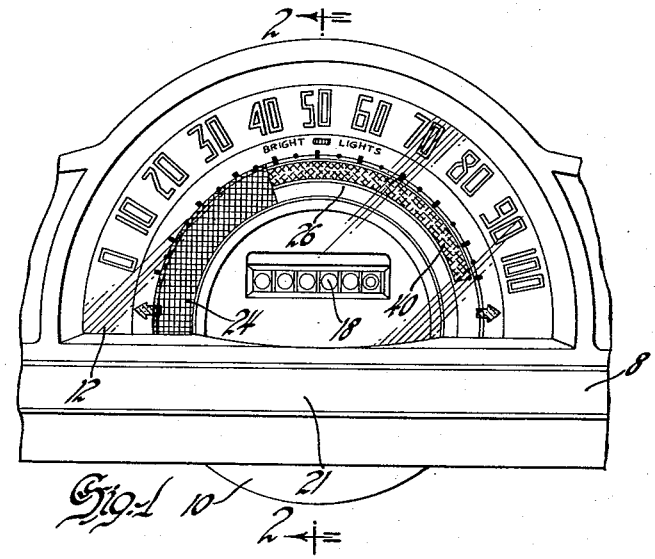
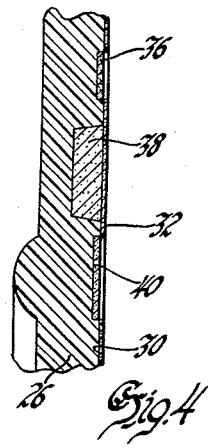
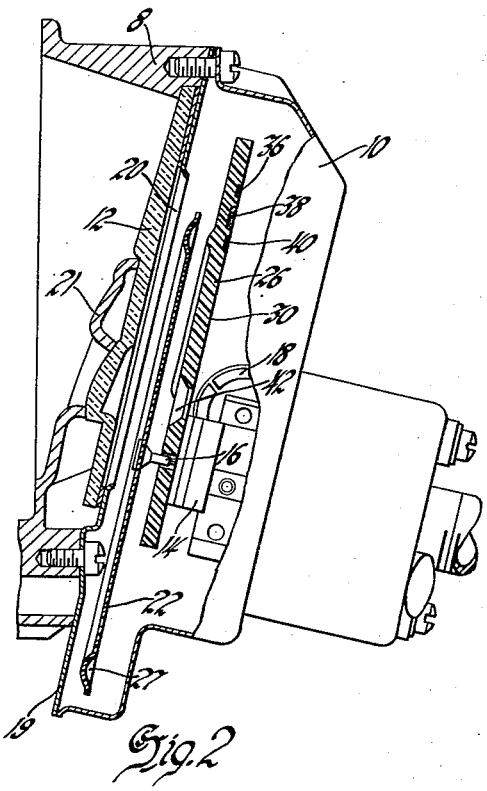
INVENTOR
Ralph O. Helgeby
BY
Willits, Helwig & Caillio
ATTORNEYS United States Patent Office 2,759,447
Patented Aug. 21, 1956

2,759,447

DISC TYPE INDICATING INSTRUMENT

Ralph O. Helgeby, Flint, Mich., assignor to General Motors Corporation, Detroit, Mich., a corporation of Delaware Application March 12, 1953, Serial No. 341,917

3 Claims. (Cl. 116—57)

This invention relates to indicating instruments such as speedometers for vehicles, and more particularly to an improved disc type indicating instrument mounted in a casing and giving a numerical and space indication of a measurement with provision for an additional means of measurement within the same casing if desired.

Speedometers have been developed heretofore in which numerical and space indication of a measurement are simultaneously given with the aid of lighting or colored effects, all serving to overcome poor lighting conditions and to give a more pronounced warning as a safety measure. In such instruments, however, it has been difficult conveniently to incorporate a second instrument such as an odometer within the same instrument casing to give a desired compactness of over-all construction.

It is an object of the present invention to provide an improved instrument of compact and attractive form giving both a space and numerical indication of a measurement and providing for convenient inclusion of a second instrument within the same casing.

To this end, an important feature of the present invention is an instrument comprising a casing having a window behind which is mounted an indicating disc of flat form with an arcuate portion which is opaque. Another feature is an indicating disc composed of a transparent portion and an arcuate opaque portion. One other feature is a rotatable disc mounted as an indicator in a measuring instrument to give both a space and a numerical reading while permitting view of a second instrument mounted within the same casing.

The above and other features of the invention will now be more particularly described in connection with the accompanying drawings and then pointed out in the claims.

In the drawings,

Figure 1 is a front view of an instrument in which the present invention is incorporated showing that instrument as mounted on the instrument panel of a car.

Figure 2 is a side elevation of the instrument and panel shown in Figure 1, drawn to a slightly larger scale, and a portion being in section along the line 2—2 of Figure 1.

Figure 3 is a front view of an element or detail shown in Figures 1 and 2 and drawn to the same scale as Figure 1.

Figure 4 is a partial view in section taken along the line 4—4 of Figure 3 and drawn to an enlarged scale.

Figure 5 is a front view of a rotatable disc shown in Figures 1 and 2 drawn to the same scale as those figures, and Figure 6 is a partial section taken along the line 6—6 of Figure 5 and drawn to an enlarged scale.

As in conventional installations of such instruments, the speedometer illustrated in the drawings as mounted on an instrument panel 8 of a car comprises a casing 10, a clear glass member 12 and a speedometer mechanism 14 with the latter being adapted to rotate an indicator shaft 16 and an odometer 18. A wall 19 of the casing 10 bears an arcuate arrangement of graduations or a numerical scale and a clear window or opening 20 (Fig. 2). As is likewise conventional, the panel 8 includes an opaque or metal shield portion 21 to conceal the lower part of the interior of the casing 10. This portion or shield 21 may or may not be part of the casing 10 as desired. The concealment is employed for the reason that the usual scale reading on such instruments does not cover a range in excess of 80 or 90 degrees.

With respect to the present invention, a flat disc 22 is provided having an arcuate portion 24 (Figs. 1 and 5) at its periphery which is opaque and preferably of a color to match the background portion of a dial 26 fixedly located within the casing 10. The disc 22 is arranged to be rotated by the shaft 16 and conveniently may be made of transparent plastic and advantageously may be dished as at 27 around its periphery to enhance its appearance. The opaque portion 24 of the disc may conveniently be so made by applying a coating 28 (Fig. 6) of suitable paint to one side of the disc. The shaft 16 is necessarily arranged at a blunt angle with the wall 19 to bring the disc 22 into correct relation with the window 20.

The face 26 of the dial may be made of transparent glass or plastic and the back side 30 thereof is given a coat 32 (Fig. 4) of paint to render it opaque except at those areas where it is desirable that a light (not shown) mounted within the casing 10 should show through. Screw holes 33 (Fig. 3) are employed in attaching the dial 26 in place. In the drawings the dial 26 is partially translucent for it is recessed as at 36 for the reception of translucent red paint, the purpose being to give an indication of bright or upper lights being turned on, such a safety feature being conventional in various other types of automobile speedometer installations. The dial 26 may also be recessed as a series of radial slots or arcuately arranged dots as at 38 and also by way of an arcuate groove 40. The dots and radial slots 38 form graduations and may be filled with translucent white paint and the arcuate slot 40 is filled with translucent orange paint. The effect desired is to cause restricted portions or areas of the dial or member 26 to be vivid in a manner to improve readability.

An attractive and convenient space indication of the speedometer reading may be had by causing the opaque portion 24 of the disc 22 to overlap, in accordance with the magnitude of the reading, the vivid arcuate groove 40 and a portion of some of the vivid slots and dots 38 as such partial overlap is indicated in Figure 1.

With the arrangement of the speedometer parts as shown in Figure 1 the opaque portion 24 of the disc 22 is so arranged as to decrease the extent of exposure of the vivid arc 40 in accordance with an increase in the magnitude of the reading to give a space indication of the speed. It is obvious that the disc 22 may be otherwise arranged so that exposure of the vivid band 40 is increased in extent as a reading of the speed increases—i. e.—the trailing end of the arc 40 may determine the instrument reading as speed is increased.

It will be noted that the dial 26, being of transparent material such as glass, is made opaque over most of its extent by the coating 30 placed upon it and conveniently an opening 42 (Figs. 2 and 3) may be provided through which readings may be observed from the odometer 18 constituting an indicator of a different measurement. The major portion of the disc 22, being transparent, is no obstacle to the reading of the odometer 18.

In regard to the disc 22, it is described herein as being flat in the sense that it has a generally level shape or appearance despite it being dished at its periphery. The invention permits such simple construction and eliminates the need of helical discs heretofore considered desirable in instruments giving vivid space readings.

A number of modifications suggest themselves; for example, the band 40 may be colored in any suitable manner, including but not limited to any given color such as orange, and, in the case of a speedometer, it may be colored green from 0 to 30 miles per hour, amber from 30 to 50 miles per hour and red from 50 to 100 miles per hour. In such an event the trailing end of the opaque portion 24, rotating clockwise, would serve to provide a space reading showing green for safe driving speeds, amber for driving speeds requiring caution and red for driving speeds in the danger zone.

It should also be noted that the disc 22, possessing a circular contour and having no through portions cut away except for the joinder of the shaft 16, may easily be formed with proper static and dynamic balance to contribute to the smoothness and accuracy in operation of the instrument.

I claim:

1. An instrument such as a speedometer for giving a measurement, comprising a casing, a clear window in a wall of said casing, a shaft arranged to be driven in proportion to the magnitude of the measurement, said shaft being journaled with its axis at a blunt angle with said wall, a member fixed in positon within said casing and presenting a vivid substance thereon to view through said window, a flat disc fixed to said shaft and arranged to be rotated thereby, one arcuate portion of said disc being transparent and another arcuate portion of said disc being opaque, and said opaque portion being positioned to alter in extent the view of said vivid substance with a change in the magnitude of measurement.

2. A speedometer for giving a measurement of speed comprising a casing, a window in a wall of said casing, a shaft arranged rotatively to be driven in proportion to the magnitude of the measurement, said shaft being journaled with its axis at a blunt angle with said wall, a member fixed in position within said casing and presenting vivid graduations to said window, a disc fixed to said shaft and bodily located between said member and said window, said disc having a transparent portion and an opaque portion, and said opaque portion being arranged to interpose between the said vivid graduations and the said window as said shaft is rotated.

3. An instrument such as a speedometer, comprising a casing, a window in a wall of said casing, a rotatable shaft mounted at a blunt angle with said wall, means fixed within said casing presenting an arcuate arrangement of graduations and a vivd arcuate band to said window, a disc fixed to said shaft concentric with said arrangement of graduations and said band, an arcuate marginal portion of said disc being opaque and arranged to move upon rotation of said shaft between said band and said window, and the remaining portion of said disc being pervious to light rays and constructed to display contents of said casing.

References Cited in the file of this patent

UNITED STATES PATENTS

| | | |
|---|---|---|
| 2,287,554 | Hansen | June 23, 1942 |
| 2,652,652 | Lasko | Sept. 22, 1953 |

FOREIGN PATENTS

| | | |
|---|---|---|
| 436,710 | Great Britain | Oct. 16, 1935 |
| 496,350 | Germany | Apr. 22, 1930 |